Sept. 8, 1953  T. H. BJURSTRÖM  2,651,454
FOOT PUMP
Filed June 7, 1950  2 Sheets-Sheet 1
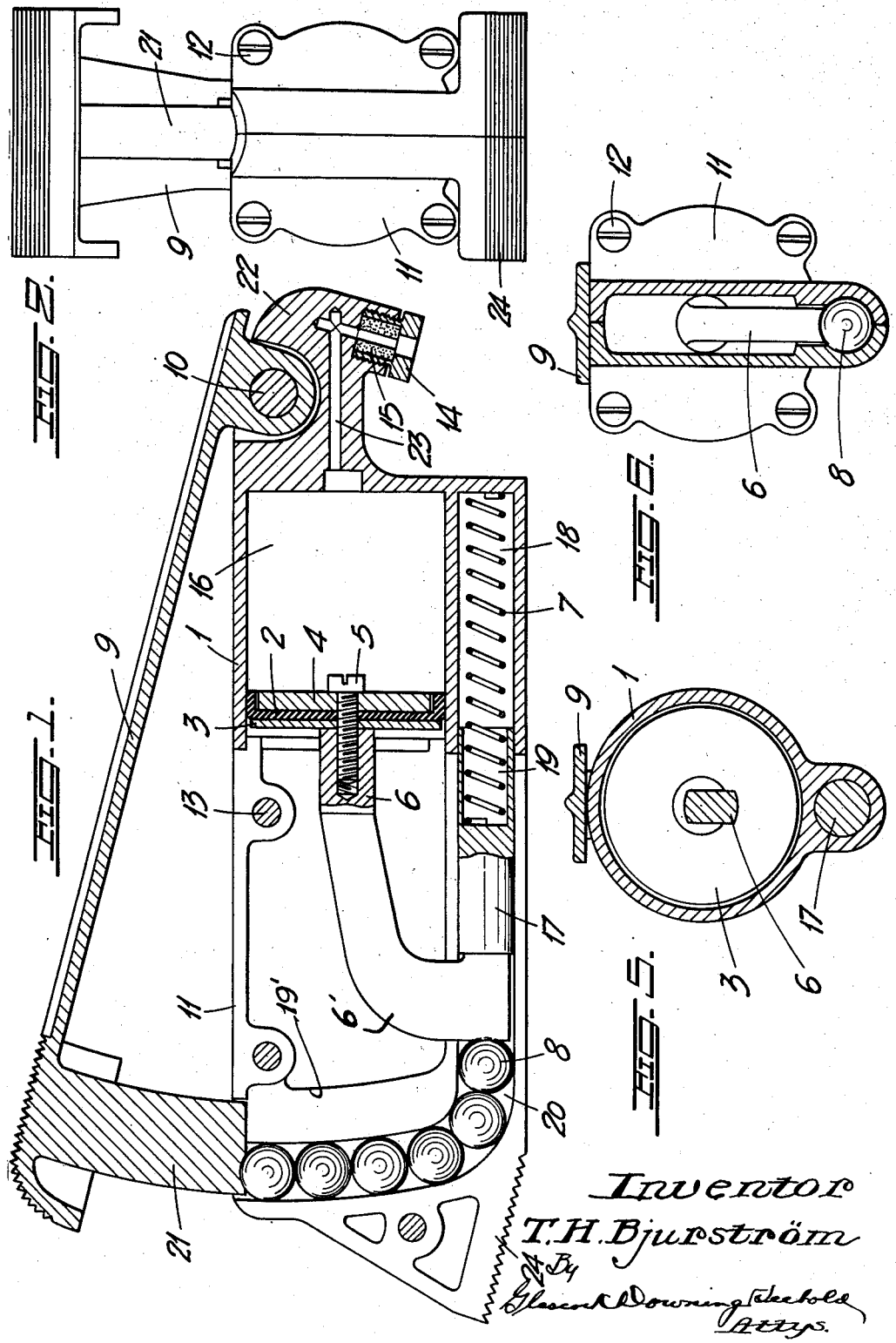
Inventor
T. H. Bjurström

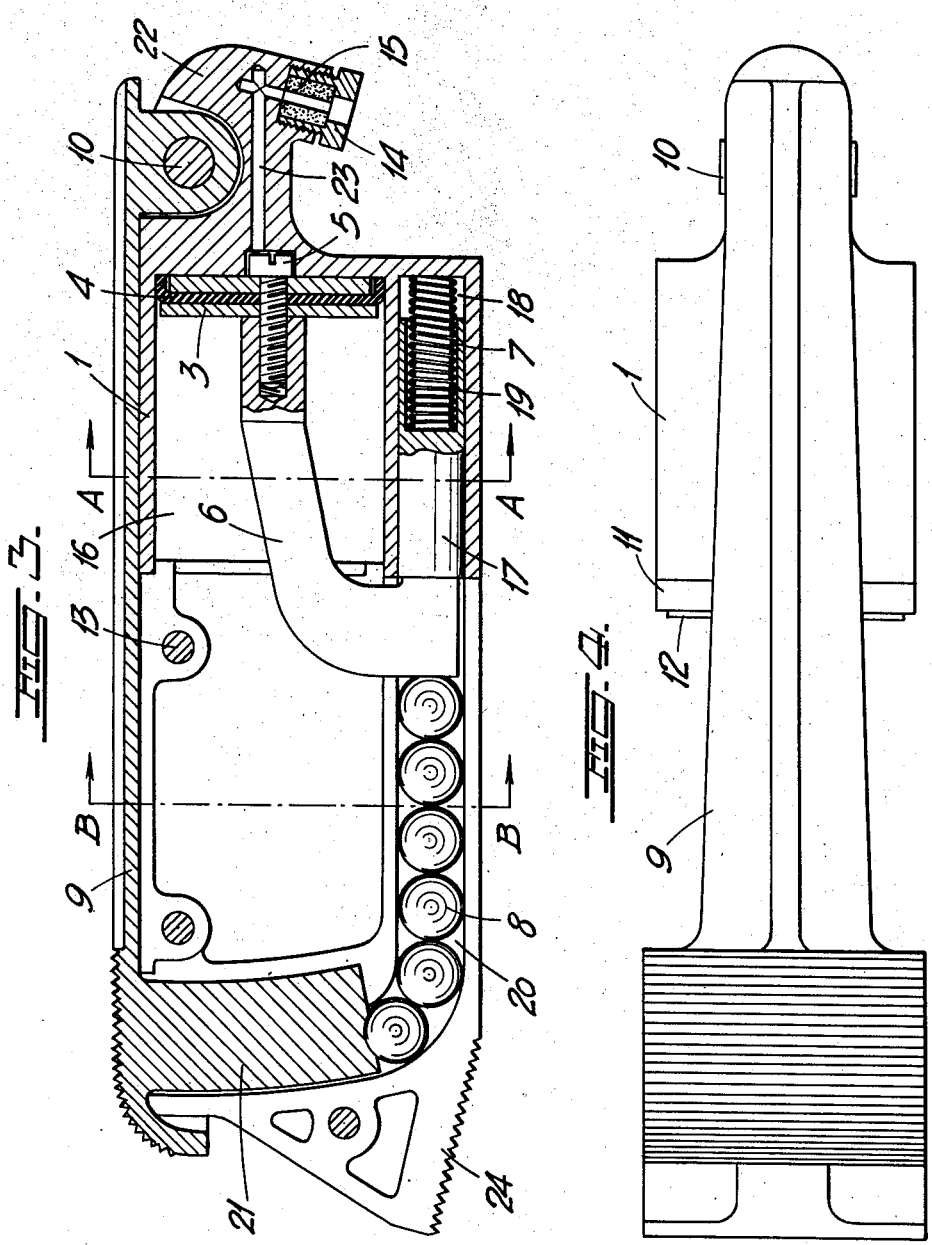

Patented Sept. 8, 1953

2,651,454

UNITED STATES PATENT OFFICE 2,651,454

FOOT PUMP

Thure Hjalmar Bjurström, Hallstahammar, Sweden

Application June 7, 1950, Serial No. 166,637
In Sweden June 21, 1948

7 Claims. (Cl. 230—172)

The present invention relates to an improved foot pump, particularly suitable for pumping air into the tyres of vehicles.

In known pumps of this kind the driving force applied to a pedal is transmitted by means of a lever or link arm system to a spring-loaded piston adapted to reciprocate within a cylinder. This constitutes a rather complicated mechanical construction which occupies a considerable amount of space and is relatively expensive in manufacture, and for these reasons such known devices have not come into more extensive use as, for example a bicycle pump, in spite of the advantages they have of being considerably less fatiguing to use than the common handpump.

According to the invention the aforesaid drawbacks may be avoided or, in any case, considerably reduced by disposing between the pedal and the piston or pistons as a movement transmitting means a series of balls or rollers which are guided along a determined curved path of movement. The pump according to the invention thus comprises only three moving means, viz. the piston and its associated piston rod, the series of balls or rollers, and the pedal. In pressing the pedal downwards the driving force for the exhaust or pressure stroke is transmitted to the piston through the series of balls or rollers and upon releasing the pressure on the pedal the piston performs its suction stroke under the influence of a spring stressed during the pressure stroke and the movement of the piston is transmitted through the series of balls or rollers to the pedal, which is thus raised in readiness for the next pressure stroke.

In order further to simplify the manufacture and thus reduce the production costs the movable parts are conveniently mounted in a housing of moulded plastics, e. g. synthetic resinous material. In this manner the pump according to the invention may be made of particularly low weight. Furthermore, the housing is preferably formed to enable the pump to be directly connected to the air valve of, for example, a bicycle tyre without using a rubber connector hose.

The invention will now be explained in greater detail in the following description of one embodiment which is also shown in the accompanying drawings.

In the drawings:

Fig. 1 shows a longitudinal section and

Fig. 2 an end view of a pump according to the invention with the movable parts in the mutual positions which they occupy at the beginning of a pressure stroke.

Fig. 3 is a longitudinal section showing the mutual positions of the movable parts at the end of the pressure stroke or the start of the suction stroke.

Fig. 4 shows a top plan view of the embodiment while,

Figs. 5 and 6 are cross sectional views taken respectively on lines A—A and B—B of Fig. 3 and seen in the direction of the arrows.

The pump housing comprises a front part 1 and a rear part 11, the latter being divided into two halves. Conveniently these parts are made of moulded plastic material. The two halves of the rear part are held together by screws 13 and are attached to the front part by screws 12.

The front part 1 contains the pump cylinder 16 wherein a piston consisting of a packing 2, suitably made of leather, and washers 3 and 4 operate. A piston rod 6 is attached to the piston by means of a screw 5. This piston rod first extends rearwardly from the piston for a distance substantially equal to the length of the pump cylinder and is then bent substantially through 180° to form a knee 6' and a portion 17 extending forwardly in a direction parallel with the axis of the cylinder 16. The portion 17 is slidably mounted in a cylindrical chamber 18 disposed in the front part 1 below and parallel with the cylinder 16 and thus forms a guiding means for the piston. Between the bottom of an axial boring 19 in the portion 17 and the closed inner end of the chamber 18 there is disposed a compression spring 7 tending to maintain the piston in its rearward position as shown in Fig. 1.

In the adjacent faces of the halves of the rear part 11 are provided recesses constituting a passageway 19' permitting the piston rod to move freely and grooves forming a channel 20 which first forms a straight continuation of the chamber 18 and then bends upwards and opens at the top of the housing. A pedal 9 is pivoted on a pin 10 at the top of the front part 1. The pedal extends rearwardly from the pin 10 over practically the whole length of the pump and carries on the lower side of its rear portion a slightly curved plunger 21 adapted to move in the upwardly extending portion of the channel 20. Between the plunger 21 and the knee 6' on the piston rod 6 lies a series of balls or rollers 8 which are guided in the channel 20. When, with the parts in the position shown in Fig. 1, a downwardly directed pressure is applied to the rear portions of the pedal 9, this pressure will be transmitted to the piston rod 6 through the intermediary of the plunger 21 and the balls or rollers 8 and under its influence the piston 2, 3, 4 will be forced forwardly within the cylinder 16 to perform a pressure stroke while at the same time compressing the spring 7 in the chamber 18. When the pressure applied is removed the spring 7 drives the piston 2, 3, 4 backwards in a suction stroke and simultaneously the balls or rollers 8 are pushed back so that the pedal 9 is raised again to its starting position.

The forward end of the front part is formed into a slender and bent snout or trunk 22 through which extends an exhaust channel 23 leading from the pump cylinder 16 to a nipple 14 having a downwardly directed opening containing a packing of rubber or the like so that a tight connection is obtained when the nipple is placed on the valve of the tyre which is to be inflated.

At its rearward lower edge the rear part 11 is provided with a broad grooved inclined supporting plate 24 so that the pump will rest steadily on the ground when the pedal is forced down.

It is to be noted that when in use the pump housing is supported at an inclination with the roughened supporting plate 24 resting horizontally on the ground. When in this position the outer surface of the nipple 14 lies in a plane parallel therewith so that it can be readily engaged about a tire valve and, incidentally, as shown in Figure 3, in normal position the foot lever 9 is also in a plane parallel with the plane of the lower surface of the plate 24, the lower surface of the nipple 14, and in fact is substantially in a plane parallel with the ground so that the operator may easily depress the same and operate the pump.

The invention must not be considered limited only to the embodiment described in detail in the foregoing specification but comprises, of course, also all such modifications and changes thereof that fall within the scope of the following claims.

I claim:

1. A foot pump comprising a housing provided at the forward end with a cylinder having an air discharge outlet and with a chamber therebeneath and parallel thereto, a spring in the chamber, a piston head in the cylinder, a piston rod extending from the head and having the outer portion bent upon itself and arranged in sliding engagement with the chamber against the tension of the spring, a foot lever pivotally connected to the top of the front part of the housing and extending above the housing, a plunger depending from the under surface of the foot lever, and an anti-friction connection means housed within the rear portion of the chamber between the piston rod and the plunger.

2. A foot pump as claimed in claim 1, wherein a ground engaging foot extends upwardly at an inclination from the lower rear portion of the housing and wherein a nipple is associated with the air discharge of the cylinder and has the outer surface arranged in a plane parallel to the ground engaging extension and the foot pedal being normally arranged in a plane parallel with the foot extension so that when the ground engaging extension is in operative position the nipple will be engaged with a valve of a tire and the foot lever will be positioned in substantially horizontal position with respect to the ground so that it may be readily operated by foot pressure of the operator.

3. A foot pump as claimed in claim 1, wherein the anti-friction means includes a series of balls guided in the rear portion of the channel and in inter-engagement with each other with the end balls respectively contacting the bent portion of the piston rod on the lower end of the plunger.

4. A foot pump of the character described comprising a housing, the front portion of which is provided with a cylinder having an air discharge outlet and with a chamber therebeneath and parallel thereto, while the rear portion is provided with a channel communicating with the outer end of the chamber, a piston head operating in the cylinder, a piston rod extending rearwardly from the head and having a portion bent downwardly and forwardly for sliding engagement in the chamber, a foot lever having the inner end pivotally mounted at the upper forward portion of the housing and overlying the same, a plunger depending from the outer end of the lever and operable in the channel, a flexible anti-friction connection operatively arranged in the channel between the bent portion of the piston rod and the plunger whereby when pressure is placed on the outer end of the foot lever the piston head will be moved forwardly in the cylinder for the discharge of air therefrom and the outer end of the piston rod will be moved into the chamber, and spring means in the chamber for turning the foot lever to normal position.

5. A foot pump according to claim 4, wherein the flexible anti-friction means consists of a plurality of interengaging rolling elements directly contacting the bent portion of the piston rod and the plunger and housed in and guided by the channel.

6. A foot pump as claimed in claim 4, wherein the housing includes a rear part composed of two interconnected recessed sections which when placed together form the channel, and means for detachably connecting said sections to the front part of the housing.

7. A foot pump as claimed in claim 4, wherein the rear portion of the housing has a foot portion extending therefrom at an upward inclination and provided with a roughened surface, a nipple at the outlet arranged at an inclination and having the outer surface in a plane parallel with the foot extension and the foot lever being also normally arranged at an inclination and in a plane parallel with the outer surface of the nipple and the roughened foot portion.

THURE HJALMAR BJURSTRÖM.

References Cited in the file of this patent

UNITED STATES PATENTS

| Number | Name | Date |
|---|---|---|
| 368,016 | Schrankel | Aug. 9, 1887 |
| 1,280,511 | Macbeth | Oct. 1, 1918 |
| 2,338,869 | Porter | Jan. 11, 1944 |